US012590184B2

(12) United States Patent (10) Patent No.: US 12,590,184 B2
Segami et al. (45) Date of Patent: Mar. 31, 2026

(54) POLYIMIDE RESIN MOLDED BODY AND PRODUCTION METHOD FOR SAME

(71) Applicant: TOYO SEIKAN GROUP HOLDINGS, LTD., Tokyo (JP)

(72) Inventors: Kouta Segami, Yokohama (JP); Kazunobu Watanabe, Yokohama (JP); Yusuke Kobayashi, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 670 days.

(21) Appl. No.: 18/008,080

(22) PCT Filed: Jun. 7, 2021

(86) PCT No.: PCT/JP2021/021473
§ 371 (c)(1),
(2) Date: Dec. 2, 2022

(87) PCT Pub. No.: WO2021/246532
PCT Pub. Date: Dec. 9, 2021

(65) Prior Publication Data
US 2023/0235123 A1 Jul. 27, 2023

(30) Foreign Application Priority Data

Jun. 5, 2020 (JP) ................................. 2020-098791

(51) Int. Cl.
| | |
|---|---|
| *C08G 73/10* | (2006.01) |
| *B29C 43/34* | (2006.01) |
| *C08G 2/34* | (2006.01) |
| *C08J 3/12* | (2006.01) |
| *B29K 79/00* | (2006.01) |

(52) U.S. Cl.
CPC .............. *C08G 73/10* (2013.01); *B29C 43/34* (2013.01); *C08G 2/34* (2013.01); *C08J 3/12* (2013.01); *B29K 2079/08* (2013.01); *C08J 2379/08* (2013.01)

(58) Field of Classification Search
CPC ....... C08J 2379/08; C08L 79/08; C08G 73/10
See application file for complete search history.

(56) References Cited

U.S. PATENT DOCUMENTS

| | | | |
|---|---|---|---|
| 6,359,107 | B1 | 3/2002 | Connell et al. |
| 2017/0252986 | A1 | 9/2017 | Watanabe et al. |
| 2020/0165451 | A1 | 5/2020 | Enokido et al. |

FOREIGN PATENT DOCUMENTS

| | | | | |
|---|---|---|---|---|
| EP | 3 892 672 | A1 | 10/2021 | |
| JP | 2003-526704 | A | 9/2003 | |
| JP | 2008-119974 | A | 5/2008 | |
| JP | 2009-274284 | A | 11/2009 | |
| WO | WO-0069948 | A1 * | 11/2000 | ......... C08G 73/1014 |
| WO | 2011/055530 | A1 | 5/2011 | |
| WO | 2016/039485 | A1 | 3/2016 | |
| WO | 2018/190370 | A1 | 10/2018 | |
| WO | 2019/107352 | A1 | 6/2019 | |

OTHER PUBLICATIONS

PETIs as High-Temperature Resin Transfer-Molding Materials PETI-matrix/carbon-ber composites made by resin-transfer molding have excellent properties, Langley Research Center, Hampton, Virginia. Published on Sep. 1, 2005.*
Extended European Search Report dated Jun. 5, 2024, issued in European Application No. 21816837.5.
International Search Report for PCT/JP2021/021473 dated Aug. 24, 2021 (PCT/ISA/210).

* cited by examiner

*Primary Examiner* — Gregory Listvoyb
(74) *Attorney, Agent, or Firm* — Sughrue Mion, PLLC

(57) ABSTRACT

An addition reaction type polyimide resin molded body having a thickness of 5 mm or more, with a number of defects having a size of 0.5 mm or more present on the entire surface of the molded body being 1 per 100 cm² or less. The addition reaction type polyimide resin molded body is formed by: holding a prepolymer of an addition reaction type polyimide resin at a temperature equal to or higher than a viscosity increase starting temperature of the addition reaction type polyimide resin and increasing a melt viscosity at a temperature lower by 10° C. than the viscosity increase starting temperature to 70 to 900 kPa·s; grinding and mixing the addition reaction type polyimide resin to form a molding precursor; and shaping the molding precursor at a temperature equal to or higher than a heat-curing temperature of the addition reaction type polyimide resin.

11 Claims, 6 Drawing Sheets

Deformation into recessed shape

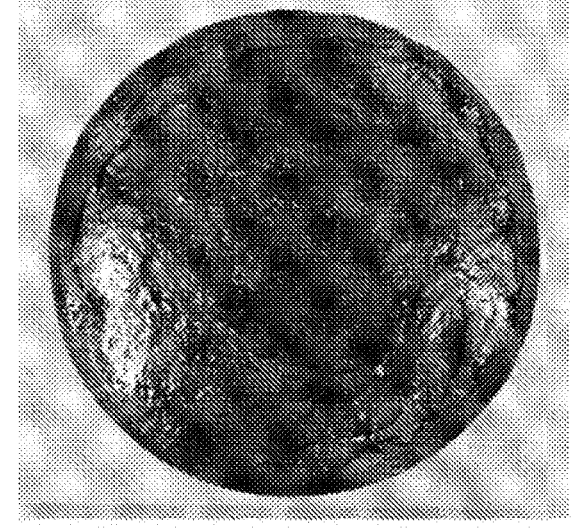
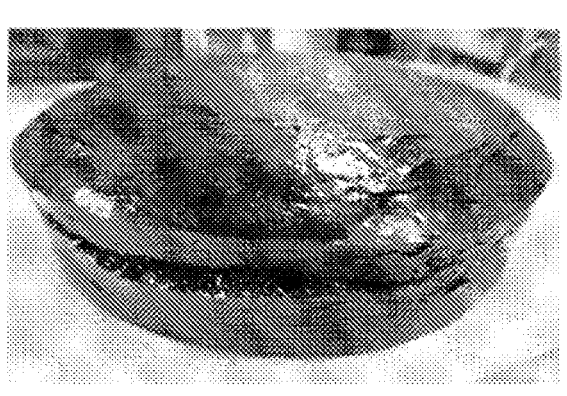
FIG. 5A
FIG. 5B

Internal void

Internal void

POLYIMIDE RESIN MOLDED BODY AND PRODUCTION METHOD FOR SAME

CROSS REFERENCE TO RELATED APPLICATIONS

This application is a National Stage of International Application No. PCT/JP2021/021473 filed Jun. 7, 2021, claiming priority based on Japanese Patent Application No. 2020-098791 filed Jun. 5, 2020.

TECHNICAL FIELD

The disclosure relates to a polyimide resin molded body and a production method for the same, and more particularly relates to a polyimide resin molded body having no surface defects or internal voids and a production method for the same.

BACKGROUND

An addition reaction type polyimide resin including an aromatic polyimide oligomer having an addition-reaction group at the end has a low melt viscosity, is excellent in impregnation into fibers, and can be favorably molded by transfer molding (RTM) or resin infusion (RI). Accordingly, the resin is widely used as a matrix of carbon fiber-reinforced composites. Composite constituent materials obtained by these methods are excellent in characteristics such as heat resistance, weather resistance, mechanical strength, and durability, and, therefore, are widely used for applications such as transportation equipment for automobiles and aircrafts, civil engineering and construction materials, and sports goods. The composite constituent materials are used in the aerospace field and the like (JP 2003-526704 A and the like).

The addition reaction type polyimide resin as described above is generally used as a matrix of carbon fiber-reinforced composites by blending functional fibers such as carbon fibers. There is an increasing demand as a neat resin molded article not containing carbon fibers and the like. In particular, the demand for a thick neat resin molded article having a thickness of 5 mm or more is large.

SUMMARY

JP 2003-526704 A related to the addition reaction type polyimide resin describes that a neat resin molded article having a diameter of 1.5 inches and a thickness of 25 mils can be molded by using an addition reaction type polyimide resin and heating the resin to 350-371° C. for 1 hour. However, the neat resin molded article described in JP 2003-526704 A is a very thin resin molded body having a thickness of about 0.6 mm. Further, in a case where a prepolymer of the addition reaction type polyimide resin is directly heated and shaped in a mold as in JP 2003-526704 A described above, the viscosity in the mold is not uniform and it is not possible to adjust the viscosity at all positions in the mold to a viscosity suitable for molding. Thus, leakage, bubbling, and expansion of the resin occur, as a result of which the formation of a thick molded article having no defects is not achieved.

Therefore, an object of the disclosure is to provide a thick molded body which includes an addition reaction type polyimide resin and has a thickness of 5 mm or more and in which surface defects, such as voids or fissures, are remarkably reduced, and a method for producing the molded body.

Another object of the disclosure is to provide a molded body including an addition reaction type polyimide resin having excellent mechanical strength in which generation of internal voids is effectively prevented even in the case of a thick molded body having a thickness of 15 mm or more, and a method for producing the molded body.

Still another object of the disclosure is to provide a molding precursor from which an addition reaction type polyimide resin molded body having a thickness of 5 mm or more can be formed.

According to the disclosure, there is provided a first addition reaction type polyimide resin molded body having a thickness of 5 mm or more, in which a number of defects having a size of 0.5 mm or more present on a surface of the molded body is 1 per 100 cm$^2$ or less.

According to the disclosure, there is also provided a second addition reaction type polyimide resin molded body having a thickness of 15 mm or more, in which the addition reaction type polyimide resin molded body has a bending strength of 60 MPa or more.

In the addition reaction type polyimide resin molded body of the disclosure, the followings are preferred:

1. the defects in the first addition reaction type polyimide resin molded body are recesses or bubbles having a maximum diameter of 0.5 mm or more or fissures having a length of 0.5 mm or more;
2. the first addition reaction type polyimide resin molded body also has a thickness of 15 mm or more and a bending strength of 60 MPa or more;
3. the addition reaction type polyimide resin is a polyimide resin having a phenylethynyl group as an addition-reaction group;
4. the molded body has a disk or rectangular flat plate shape with a thickness of 5 to 30 mm; and
5. the addition reaction type polyimide resin molded body does not deform or deforms into a recessed shape with a height of less than 1 mm when heated at a temperature of 357° C. for 6 hours.

According to the disclosure, there is provided a method for producing an addition reaction type polyimide resin molded body.

The method includes: increasing a melt viscosity at a temperature lower by 10° C. than a viscosity increase starting temperature of an addition reaction type polyimide resin to 70 to 900 kPa·s by holding a prepolymer of the addition reaction type polyimide resin at a temperature equal to or higher than the viscosity increase starting temperature; grinding and mixing the addition reaction type polyimide resin subjected to the increasing of the melt viscosity to powderize the addition reaction type polyimide resin; and shaping the powderized addition reaction type polyimide resin at a temperature equal to or higher than a heat-curing temperature of the addition reaction type polyimide resin.

In the method for producing an addition reaction type polyimide resin molded body of the disclosure, the followings are preferred:

1. the addition reaction type polyimide resin is held in a temperature range higher by 15 to 45° C. than the viscosity increase starting temperature for 50 to 200 minutes in the increasing of the melt viscosity; and
2. the shaping is performed by compression molding.

According to the disclosure, there is provided a molding precursor including an addition reaction type polyimide resin, in which the addition reaction type polyimide resin has a melt viscosity of 70 to 900 kPa·s at a temperature lower by 10° C. than a viscosity increase starting temperature of the addition reaction type polyimide resin.

In the present specification, the bending strength and the viscosity increase starting temperature are defined as follows.

(1) Bending Strength

In accordance with JIS K 7171 (Plastics-Determination of Flexural Properties), the thickness direction of the molded body (moving direction of the mold) is a thickness of a test piece (50 mm in length, 10 mm in width, and 3 mm in thickness). Test pieces each having a length of 50 mm, a width of 10 mm and a thickness of 3 mm are cut out. One is cut out downward in the thickness direction from the upper surface of the molded body. One is cut out from the center (middle plane) of the thickness (t) (position of t/2) of the molded body. One is cut out upward in the thickness direction from the lower surface of the molded body. A bending test is performed using these test pieces, and the smallest value of the obtained bending stresses of the test pieces is defined as the bending strength of the molded body. The measurement conditions will be described later.

(2) Viscosity Increase Starting Temperature

The viscosity of the addition reaction type polyimide resin in an unreacted state is measured at an angular frequency of 100 rad/s using a parallel plate as a rheometer, under the conditions that the temperature is raised at 4° C./min, and after the temperature reaches a predetermined target temperature, the resin is held at the target temperature for a certain period of time. The melting occurs as the temperature increases, and the viscosity decreases. The lowest viscosity during the measurement is defined as the minimum melt viscosity, and the melt viscosity is tracked for 120 minutes since the temperature reached the target temperature. The target temperature is set from a low temperature to a high temperature in multiples of 5, and the melt viscosity at each of the target temperatures is measured. The melt viscosity is plotted on a single logarithmic graph in which the time of showing the minimum melt viscosity is 0 minute, the horizontal axis is time (min), and the vertical axis is melt viscosity (Pa·s), and an exponential approximation formula is obtained by spreadsheet software. The temperature at which a value B in an approximation formula shown in Formula (1) below exceeds 0.014 for the first time is defined as the viscosity increase starting temperature.

$$Y=A\exp(Bx) \tag{1}$$

where Y is a melt viscosity (Pa·s), x is time (min), and A and B are constants.

The resin molded body according to the disclosure is a resin molded body that has a thickness of 5 mm or more and includes an addition reaction type polyimide resin excellent in heat resistance, durability, and mechanical strength. The resin molded body can be provided as a thick molded body in which the number of surface defects having a size of 0.5 mm or more is significantly reduced. In the present specification, the term "surface defects" refers to, but not limited to, bubbles formed on the surface due to air contained in the resin, generated gas from the resin, or the like, recessed defects (also referred to as "voids" or "depressions") generated on the surface due to crushing of the bubbles or deformation during compression, or fissures.

Further, even when the resin molded body of the disclosure has a thickness of 15 mm or more, no voids are formed in the molded body, and thus, the resin molded body has a bending strength of 60 MPa or more and has excellent mechanical strength.

Furthermore, according to the method for producing a resin molded body of the disclosure, the viscosity is adjusted in advance in a temperature range higher by 15 to 45° C.

than the viscosity increase starting temperature of the addition reaction type polyimide resin, and the resin is ground and mixed, so that it is possible to effectively prevent the occurrence of a difference in viscosity depending on the position in the mold at the time of shaping, and it is possible to mold a molded body having a thickness of 5 mm or more, particularly a thickness of 5 to 30 mm, without causing defects such as voids and fissures.

Furthermore, since the molding precursor of the disclosure is uniformly adjusted to a suitable melt viscosity at a molding temperature for the resin molded body, it is not necessary to adjust the viscosity immediately before shaping, and there is no possibility of generation and crushing of bubbles as in a case where the viscosity is adjusted by heating immediately before shaping. Thus, it is possible to efficiently mold a thick resin molded body having no surface defects and internal voids.

BRIEF DESCRIPTION OF DRAWINGS

FIG. 5A is a photograph showing a surface (compression surface) of a molded article obtained in Comparative Example 7 after being subjected to post-heating.

FIG. 5B is a photograph showing a surface (side surface) of a molded article obtained in Comparative Example 7 after being subjected to post-heating.

DESCRIPTION OF EMBODIMENTS

Resin Molded Body

As described above, regarding the neat resin molded body made from an addition reaction type polyimide resin, it has been difficult to mold a resin molded body having a thickness of 5 mm or more without causing defects in the surface of the molded body. However, the resin molded body of the disclosure has a thickness of 5 mm or more, and the number of surface defects having a size of 0.5 mm or more is reduced to 1 per 100 cm² or less.

The shape of the resin molded body in the disclosure is not limited as long as the resin molded body has a thickness of 5 mm or more, particularly a thickness of 5 to 30 mm. Specifically, as apparent from the method for molding a resin molded body of the disclosure to be described later, the shape is not particularly limited as long as it can be molded by compression molding or transfer molding. Further, the term "thickness" refers to the maximum thickness in the molded body to be obtained. In the case of being obtained by compression molding or transfer molding, the moving direction of the mold is the thickness direction of the resin molded body.

Figure 1:
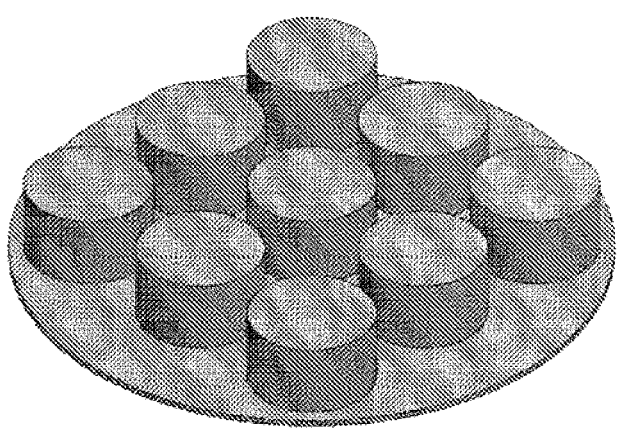
FIG. 1 is a diagram illustrating an example of a resin molded body according to the disclosure.

Examples of the shape suitable for the resin molded body of the disclosure include: a flat plate shape such as a disk shape or a rectangular shape; a cylindrical shape; a prismatic shape; a shape having a curved surface; and a resin molded body in which a plurality of molded bodies having the above-described shape such as a disk shape, as illustrated in FIG. 1, is formed.

The resin molded body of the disclosure has no defects having a size of 0.5 mm or more, particularly having a size of 0.5 to 50 mm, that is, the number of defects can be brought close to 0. In other words, even when the molded body has defects, the number of defects on the entire surface of the molded body is reduced to 1 per 100 cm$^2$ or less.

The defects described above are not limited thereto, but are recessed defects or bubbles having a maximum diameter of 0.5 mm or more, or fissures having a maximum length of 0.5 mm or more, and the like. Particularly, examples thereof include defects shown in FIG. 4.

The addition reaction type polyimide resin molded body of the disclosure does not deform even when heated at a temperature of 357° C. for 6 hours, or even when deformation occurs, the addition reaction type polyimide resin molded body only deforms into a recessed shape with a height of less than 1 mm, and has excellent thermal stability. Hence, in the resin molded body of the disclosure, the melt viscosity of the molding precursor in the mold is uniform and thermally cured sufficiently and uniformly in the shaping as described later. Thus, the content of the prepolymer in the unreacted addition reaction type polyimide resin is reduced as much as possible. Accordingly, even when the resin molded body is further subjected to a process of heating under the above heating conditions, the deformation into a recessed shape due to bubbling, expansion, or the like based on the reaction of the prepolymer of the addition reaction type polyimide resin is reduced as much as possible, and the resin molded body is excellent in thermal stability. In the present specification, the deformation into a recessed shape is defined as a difference in the maximum thickness of the addition reaction type polyimide resin molded body between before and after being heated at a temperature of 357° C. for 6 hours.

When a molded body including an addition reaction type polyimide resin is generally formed into a thick molded body having a thickness of 15 mm or more, voids are likely to be formed therein, and thus the mechanical strength tends to decrease. However, in the resin molded body of the disclosure, bubbling, expansion, and the like are reduced as described above, formation of voids in the molded body is reduced even in the thick molded body having a thickness of 15 mm or more. As a result, the molded body has a high bending strength of 60 MPa or more, and has excellent mechanical strength.

In the second addition reaction type polyimide resin molded body of the disclosure, it is also possible to remove surface defects by a process such as polishing of the surface since the thickness of the thick molded body is 15 mm or more. The surface defects need not be significantly reduced as in the definition of the first addition reaction type polyimide resin molded body.

Addition Reaction Type Polyimide Resin

The addition reaction type polyimide resin constituting the resin molded body of the disclosure is made from an aromatic polyimide oligomer having an addition-reaction group at the end, and it is possible to use an addition reaction type polyimide resin prepared by a known method. For example, the addition reaction type polyimide resin can be readily obtained by using an aromatic tetracarboxylic dianhydride, an aromatic diamine, and a compound having an anhydride group or an amino group with an addition-reaction group in the molecule so as to allow the sum of the equivalents of acid groups to be approximately equal to the total of amino groups, and preferably reacting them in a solvent. Examples of the reaction method include a two-step method for polymerizing the compounds at a temperature of 100° C. or lower, preferably 80° C. or lower for 0.1 to 50 hours to form an oligomer having an amide acid bond, and then, subjecting the oligomer to chemical imidization with an imidization agent, or subjecting the oligomer to thermal imidization by heating the compounds at a high temperature of about 140 to 270° C.; and a one-step method including for subjecting the compounds to polymerization and imidization reactions at a high temperature of 140 to 270° C. from the beginning for 0.1 to 50 hours.

The solvent used in these reactions is not limited thereto, but organic polar solvents such as N-methyl-2-pyrrolidone, N,N-dimethylformamide, N,N-dimethylacetamide, N,N-diethylacetamide, γ-butyl lactone, and N-methylcaprolactam can be preferably used.

In the disclosure, the addition-reaction group at the end of the aromatic imide oligomer is not particularly limited as long as it is a group that performs a curing reaction (addition polymerization reaction) by heat when producing a resin molded body. In consideration that the curing reaction is preferably performed, and the heat resistance of the resulting cured product is good, the addition-reaction group is preferably any reaction group selected from the group consisting of a phenylethynyl group, an acetylene group, a nadic acid group, and a maleimide group. Particularly, a phenyl ethynyl group is preferred because no gas component is generated by the curing reaction, and the resulting resin molded body is excellent in heat resistance and mechanical strength.

These addition-reaction groups are introduced into the ends of the aromatic imide oligomer by a reaction in which a compound having an anhydride group or an amino group with an addition-reaction group in the molecule preferably forms an imide ring with an amino group or an acid anhydride group at the end of the aromatic imide oligomer.

As the compound having an anhydride group or an amino group with an addition-reaction group in the molecule, for example, 4-(2-phenylethynyl)phthalic anhydride, 4-(2-phenylethynyl)aniline, 4-ethynyl-phthalic anhydride, 4-ethynylaniline, nadic anhydride, or maleic anhydride can be preferably used.

Examples of the tetracarboxylic acid component that forms an aromatic imide oligomer having an addition-reaction group at the end can include at least one tetracarboxylic acid dianhydride selected from the group consisting of 2,3,3',4'-biphenyl tetracarboxylic dianhydride, 2,2',3,3'-biphenyl tetracarboxylic dianhydride, 3,3',4,4'-biphenyl tetracarboxylic dianhydride, and 3,3',4,4'-benzophenone tetracarboxylic dianhydride. Particularly, 2,3,3',4'-biphenyl tetracarboxylic dianhydride can be preferably used.

Examples of the diamine component that forms an aromatic imide oligomer having an addition-reaction group at the end include, but are not limited to, diamine having one benzene ring, such as 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,4-diamine, and 3,5-diethyltoluene-2,6-diamine; diamine having two benzene rings, such as 4,4'-diaminodiphenylether, 3,4'-diaminodiphenyl ether, 3,3'-diaminodiphe-nyl ether, 3,3'-diaminobenzophenone, 4,4'-diaminobenzo-phenone, 4,4'-diaminodiphenylmethane, 3,3'-diaminodiphenylmethane, bis(2,6-diethyl-4-aminophenoxy)methane, bis(2-ethyl-6-methyl-4-aminophenyl)methane, 4,4'-methylene-bis(2,6-diethylaniline), 4,4'-methylene-bis(2-ethyl-6-methylaniline), 2,2-bis(3-aminophenyl)propane, 2,2-bis(4-aminophenyl)propane benzidine, 2,2'-bis(trifluo-romethyl)benzidine, 3,3'-dimethylbenzidine, 2,2-bis(4-ami-nophenyl)propane, and 2,2-bis(3-aminophenyl)propane benzidine; diamine having three benzene rings, such as 1,3-bis(4-aminophenoxy)benzene, 1,3-bis(3-aminophe-noxy)benzene, 1,4-bis(4-aminophenoxy)benzene, and 1,4-bis(3-aminophenoxy)benzene; and diamine having four ben-zene rings, such as 2,2-bis[4-[4-aminophenoxy]phenyl] propane, and 2,2-bis[4-[4-aminophenoxy]phenyl] hexafluoropropane. These components can be used independently or as a mixture of a plurality of components.

Among these components, it is preferable to use a mixed diamine including at least two aromatic diamines selected from the group consisting of 1,3-diaminobenzene, 1,3-bis (4-aminophenoxy)benzene, 3,4'-diaminodiphenyl ether, 4,4'-diaminodiphenyl ether, and 2,2'-bis(trifluoromethyl) benzidine. From the viewpoint of heat resistance and mold-ability, it is particularly preferable to use a mixed diamine including a combination of 1,3-diaminobenzene and 1,3-bis (4-aminophenoxy)benzene; a mixed diamine including a combination of 3,4'-diaminodiphenyl ether and 4,4'-di-aminodiphenyl ether; a mixed diamine including a combi-nation of 3,4'-diaminodiphenyl ether and 1,3-bis(4-amino-phenoxy)benzene; a mixed diamine including a combination of 4,4'-diaminodiphenyl ether and 1,3-bis(4-aminophenoxy) benzene; and a mixed diamine including a combination of 2,2'-bis(trifluoromethyl)benzidine and 1,3-bis(4-aminophe-noxy)benzene.

In the aromatic imide oligomer having an addition-reac-tion group at the end used in the disclosure, it is preferable that the number of repetitions of the repeating unit of the imide oligomer is from 0 to 20, particularly from 1 to 5, and it is preferable that the number average molecular weight in terms of styrene by GPC is 10,000 or less, particularly 3000 or less. When the number of repetitions of the repeating unit is in the above range, the melt viscosity is adjusted to an appropriate range, and thus it is possible to mix the func-tional fibers. Further, it is not necessary to perform molding at a high temperature, and it is possible to provide a resin molded body being excellent in moldability and being excellent in heat resistance and mechanical strength.

The number of repetitions of the repeating unit can be adjusted by changing the proportions of an aromatic tetra-carboxylic dianhydride, an aromatic diamine, and a com-pound having an anhydride group or an amino group with an addition-reaction group in the molecule. By increasing the proportion of the compound having an anhydride group or an amino group with an addition-reaction group in the molecule, the molecular weight is decreased, thereby mak-ing the number of repetitions of the repeating unit small. By decreasing the proportion of this compound, the molecular weight is increased, thereby making the number of repeti-tions of the repeating unit large.

Depending on the intended use of the resin molded body, resin additives such as a flame retardant, a colorant, a lubricant, a thermal stabilizer, a light stabilizer, an ultraviolet absorber, and a filler may be added to the addition reaction type polyimide resin according to the known formulation.

Method for Producing Resin Molded Body

The method for producing a resin molded body of the disclosure includes: increasing a melt viscosity at a tem-perature lower by 10° C. than a viscosity increase starting temperature of an addition reaction type polyimide resin to 70 to 900 kPa·s by holding a prepolymer of the addition reaction type polyimide resin at a temperature equal to or higher than the viscosity increase starting temperature of the addition reaction type polyimide resin; grinding and mixing the addition reaction type polyimide resin subjected to the increasing of the melt viscosity to powderize the addition reaction type polyimide resin; and shaping the powderized addition reaction type polyimide resin at a temperature equal to or higher than a heat-curing temperature of the addition reaction type polyimide resin.

The addition reaction type polyimide resin to be used for the production of the resin molded body of the disclosure has a low viscosity in the state of the prepolymer before being cured by crosslinking. Thus, the viscosity of the prepolymer supplied to the mold is increased in the shaping of the resin molded body, causing a problem: the viscosity is less likely to increase near the center in the mold, the viscosity largely increases in the vicinity of the mold, and thus the viscosity of the prepolymer is not uniform. In a case where the viscosity is adjusted based on the central portion of the mold, the prepolymer in the vicinity of the wall of the mold is thermally decomposed to foam and expand, and the bubbles are crushed by pressurization by the subsequent compression molding to generate voids. Meanwhile, in a case where the viscosity of the prepolymer in the vicinity of the wall of the mold is used as a reference, the viscosity is too low to perform molding, and the melted resin leaks from the mold.

In the disclosure, before the shaping, the melt viscosity of the prepolymer at a temperature lower by 10° C. than the viscosity increase starting temperature is increased to 70 to 900 kPa·s by the increasing of the melt viscosity, and an addition reaction type polyimide resin having a melt vis-cosity adjusted to the above range is powderized and mixed by the subsequent grinding and mixing to prepare a powdery molding precursor having a uniform melt viscosity. This eliminates the need for increasing the viscosity in the shaping. Consequently, as described above, it is possible to mold a resin molded body having a thickness of 5 mm or more in which there are no defects having a size of 0.5 mm or more, and even when there are defects, the number of surface defects is reduced to 1 per 100 cm$^2$ or less.

Increasing of Melt Viscosity

In the increasing of the melt viscosity, a prepolymer (imide oligomer) of the addition reaction type polyimide resin is first held at a temperature equal to or higher than the viscosity increase starting temperature of the addition reac-tion type polyimide resin for a certain period of time using an electric furnace or the like to increase the melt viscosity to 70 to 900 kPa·s. Preferably, the prepolymer is held in a temperature range higher by 15 to 45° C. than the viscosity increase starting temperature for 50 to 200 minutes, particu-larly for 65 to 110 minutes, to increase the melt viscosity of the prepolymer, at a temperature lower by 10° C. than the viscosity increase starting temperature, to 70 to 900 kPa·s.

The prepolymer is held at the temperature described above for a certain period of time, and the prepolymer gradually starts to crosslink, and thus the viscosity increases. The heating temperature and the holding time are set to the ranges described above, so that it is possible to increase only the viscosity to the above range without completely curing the prepolymer by crosslinking. Therefore, the increasing of the melt viscosity is performed at a temperature which is equal to or higher than the viscosity increase starting temperature of the prepolymer, and is less than the temperature at which the prepolymer is completely cured by crosslinking.

In the addition reaction type polyimide resin, the reaction starting temperature depends on the addition-reaction group. In the disclosure, it is desirable to increase the melt viscosity of the polyimide resin having a phenylethynyl group suitable as the addition-reaction group to 70 to 900 kPa·s by holding the resin at a temperature of 320±15° C., which is near the viscosity increase starting temperature, for a certain period of time.

After the increasing of melt viscosity, the addition reaction type polyimide resin is solidified by cooling (including the process of being allowed to cool) to form a mass. The mass can also be stored over time and is excellent in handling, but there is a difference in viscosity in the position of the mass, for example, the center portion of the mass. Accordingly, it is preferable that the molding precursor of the disclosure is a powder in a state of being powderized and mixed by the grinding and mixing to be described below.

Grinding and Mixing

In the mass of the addition reaction type polyimide resin having a melt viscosity adjusted to 70 to 900 kPa·s at a temperature lower by 10° C. than a viscosity increase starting temperature, the resin being obtained through the increasing of the melt viscosity, there is a difference in viscosity depending on the position of the mass as described above. Thus, in the disclosure, this mass is ground and mixed to form a powdery molding precursor.

For grinding and mixing, a known grinding and mixing machine such as a Henschel mixer, a tumbler mixer, a ribbon blender, a jet mill, a roller mill, a ball mill, a spike mill, or a vibration mill can be used, but it is particularly preferable to use a Henschel mixer because grinding and mixing can be performed simultaneously and efficiently.

As for the particle size of the powdery molding precursor, the average particle size (D50) measured by the laser scattering diffraction method is preferably in a range of 1 to 1000 μm.

Shaping

As described above, the molding precursor of the disclosure has a melt viscosity of 70 to 900 kPa·s at a temperature lower by 10° C. than a viscosity increase starting temperature of the addition reaction type polyimide resin, and thus, when molding a resin molded body, the powdery molding precursor after being ground and mixed can be directly shaped at a temperature equal to or higher than the heat-curing temperature of the addition reaction type polyimide.

Further, in order to equalize the temperature of the ground molding precursor, it is possible to provide preheating in which, as necessary, a powdery molding precursor is introduced into a mold, and then held in the mold at a temperature that is equal to or higher than the melting temperature and is equal to or lower than the viscosity increase starting temperature for a predetermined period of time, preferably at a temperature lower by 5 to 20° C. than the viscosity increase starting temperature for 10 to 30 minutes.

The powdery molding precursor introduced into the mold or the molding precursor slightly melted through the preheating in the mold is molded into a desired resin molded body by shaping the molding precursor at a temperature equal to or higher than the heat-curing temperature of the addition reaction type polyimide resin to be used, specifically, at a temperature of 360 to 390° C. in the case of a polyimide resin having a phenylethynyl group as an addition-reaction group. The powdery molding precursor of the disclosure is ground and mixed, so the precursor has a uniform melt viscosity as a molding precursor. Consequently, when the precursor is heated at a temperature equal to or higher than the heat-curing temperature, there is no difference in viscosity depending on the place in the mold, and the precursor is uniformly melted in the mold. As a result, even when the resin is pressurized and compressed by compression molding or the like, the flow of the resin is reduced, and bubbling and expansion do not occur. Thus, as described above, it is possible to mold a resin molded body which has a thickness of 5 mm or more, particularly a thickness of 5 to 30 mm, and in which there are no defects having a size of 0.5 mm or more, and the number of defects is 1 per 100 cm² or less even when defects are generated.

From the perspective of molding a molded body having a thickness of 5 mm or more, the molded body is preferably molded by a compression molding technique or a transfer molding technique which pressurizes and compresses a mixture introduced into a mold may be preferred, but the molded body may be molded by an injection molding technique or an extrusion molding technique.

EXAMPLES

Measurement of Viscosity Increase Starting Temperature

The viscosity increase starting temperature of the addition reaction type polyimide resin used was measured with a rheometer. The melt viscosity is measured at an angular frequency of 100 rad/s and a strain of 10% using a parallel plate under the temperature conditions where the rate to reach the target temperature is 4° C./min and the temperature is held for 120 minutes after the temperature reaches the target temperature. The melt viscosity is plotted on a single logarithmic graph in which the time of showing the minimum melt viscosity is 0 minute, the horizontal axis is time (min), and the vertical axis is melt viscosity (Pa·s). Then the coefficient B of Formula (1) is determined by an exponential approximation formula. In the addition polymerization polyimide (PETI-330, manufactured by Ube Industries, Ltd.), the B value when the target temperature was 285° C. was determined to be 0.0092, the B value when the target temperature was 290° C. was determined to be 0.0141, and thus, the viscosity increase starting temperature was set to 290° C.

Measurement of Melt Viscosity

The melt viscosity at a temperature lower by 10° C. than the viscosity increase starting temperature of the addition reaction type polyimide resin used was measured with a rheometer (ARES-G2, manufactured by TA Instruments). The melt viscosity was measured at a strain of 1% (measurement gap: 1 mm) in an angular frequency range of 0.1 to 100 rad/s using a parallel plate, and the melt viscosity at 0.1 rad/s was used as the measured value. In this regard, in measuring, the powdery molding precursor was heated and pressed into a flat plate shape with a hot press at a temperature lower by 10° C. to 40° C. than the viscosity increase starting temperature.

Measurement of Bending Strength

In accordance with MS K 7171 (Plastics-Determination of Flexural Properties), a bending test was performed on test pieces (50 mm in length, 10 mm in width, and 3 mm in thickness) cut out from the resin molded body at a test rate of 1 mm/min using an auto graph (AG-1-50N-10 kN, manufactured by Shimadzu Corporation), and the bending strength was measured.

The test pieces were cut in such a manner that one has a thickness of 3 mm downward from the upper surface of the resin molded body in the thickness direction, one has a thickness of 3 mm between positions ±1.5 mm away from the middle plane in the thickness direction, and one has a thickness of 3 mm upward from the lower surface of the molded body in the thickness direction.

Evaluation of Surface Defects

The presence or absence and the number of defects were visually confirmed, and the size of defects was measured with a measuring instrument such as a ruler and a vernier caliper. When the number of defects having a size of 0.5 mm or more present on the entire surface of the molded body was 1 per 100 cm$^2$ or less, it was determined that the result was Good, whereas, when the number of defects was more than 1 per 100 cm$^2$, it was determined that the result was Poor.

Evaluation of Molded Article Subjected to Post-heating

The maximum thickness of the addition reaction type polyimide resin molded body before and after being heated at a temperature of 357° C. for 6 hours was measured using a measuring instrument such as a vernier caliper or a height gauge. When the thickness difference was less than 1 mm, it was determined that the result was Good, meanwhile, when the thickness difference was 1 mm or more, it was determined that the result was Poor.

Example 1

An addition reaction type polyimide (PETI-330, manufactured by Ube Industries, Ltd.) was held in an electric furnace at a resin temperature of 330° C. for 65 minutes, and the melt viscosity was adjusted to 126.6 kPa·s: melt viscosity at 280° C., i.e., a temperature lower by 10° C. than the viscosity increase starting temperature of the addition reaction type polyimide. Thereafter, the resin was rapidly quenched to yield a mass of addition reaction type polyimide resin, the mass being cooled to room temperature. The resulting resin mass was ground and mixed by a grinding and mixing machine, and then the ground resin was supplied to a compression mold and preheated at 280° C. for 90 minutes. After that, the temperature was raised to 320° C. at a temperature raising rate of 0.3° C./min while the resin was being pressurized to 11.0 MPa, the resin was held for 60 minutes. Further, the temperature was raised to 371° C. at a temperature raising rate of 0.43° C./min, and the resin was held for 120 minutes, and then slowly cooled to yield a disk-shaped plate having φ 200 mm and a thickness of 5 mm.

Example 2

The same procedure was performed as in Example 1 except that the resin temperature in the electric furnace was changed to 330° C., the holding time was changed to 95 minutes, and the melt viscosity was adjusted to 642.9 kPa·s, which was the melt viscosity at 280° C., i.e., a temperature lower by 10° C. than the viscosity increase starting temperature of the addition reaction type polyimide.

Examples 3, 5, 7, 9, and 11

The same procedure was performed as in Example 1 except that the thickness of each of the molded articles was set to the thickness shown in Table 1.

Examples 4, 6, 8, 10, and 12

The same procedure was performed as in Example 2 except that the thickness of each of the molded articles was set to the thickness shown in Table 1.

Example 13

The same procedure was performed as in Example 11 except that the resin temperature in the electric furnace was changed to 330° C. and the holding time was changed to 110 minutes to adjust the viscosity. It was not possible to measure the melt viscosity at 280° C., i.e., a temperature lower by 10° C. than the viscosity increase starting temperature, of the addition reaction type polyimide resin whose viscosity was adjusted, and thus the increasing of the melt viscosity was reproduced in the rheometer. The temperature in the rheometer was raised from 280° C. at 3.1° C./min, and the time point at which the temperature reached 330° C. was defined as 0 minute, and the complex viscosity value (896.3 kPa·s) at the time point when 110 minutes had elapsed was used as the melt viscosity. For the measurement, a parallel plate (φ 25 mm) was used, and the angular frequency was set to 10 rad/s.

Example 14

The same procedure was performed as in Example 11 except that the resin temperature in the electric furnace was changed to 330° C. and the holding time was changed to 120 minutes to adjust the viscosity. It was not possible to measure the melt viscosity at 280° C., i.e., a temperature lower by 10° C. than the viscosity increase starting temperature, of the addition reaction type polyimide resin whose viscosity was adjusted, and thus the increasing of the melt viscosity was reproduced in the rheometer. The temperature in the rheometer was raised from 280° C. at 3.1° C./min, and the time point at which the temperature reached 330° C. was defined as 0 minute, and the complex viscosity value (1151.1 kPa·s) at the time point when 120 minutes had elapsed was used as the melt viscosity. For the measurement, a parallel plate (φ25 mm) was used, and the angular frequency was set to 10 rad/s.

Comparative Example 1

An addition reaction type polyimide (PETI-330, manufactured by Ube Industries, Ltd.) was supplied to a compression mold and preheated at a mold temperature of 280° C. for 90 minutes. After that, the temperature was raised to 320° C. at 3.3° C./min, the resin was held in the mold at 320° C. for 45 minutes. The temperature was raised to have a viscosity at which resin leakage did not occur during compression molding, and then raised to 371° C. at a temperature raising rate of 0.85° C./min while the resin was being pressurized to 11.0 MPa. The resin was held for 120 minutes, and then slowly cooled to yield a disk-shaped plate having φ 200 mm and a thickness of 3 mm.

Comparative Example 2

The same procedure was performed as in Comparative Example 1 except that the thickness of the molded article was 5 mm.

Comparative Examples 3 to 7

The same procedure was performed as in Comparative Example 1 except that the mold temperature was changed to 320° C., the holding time was changed to 40 minutes, and the thickness of the molded article was set to the thickness shown in Table 2.

Comparative Example 8

The same procedure was performed as in Example 11 except that the resin temperature in the electric furnace was changed to 330° C., the holding time was changed to 60 minutes, and the melt viscosity was adjusted to 60.4 kPa·s, which was the melt viscosity at 280° C., i.e., a temperature lower by 10° C. than the viscosity increase starting temperature of the addition reaction type polyimide.

Tables 1 and 2 show the melt viscosities of the addition reaction type polyimide resins obtained through the increasing of the melt viscosity in Examples 1 to 14 and Comparative Examples 1 to 8, evaluation of surface defects of the molded articles, and the results of the evaluation of the molded articles subjected to post-heating. In Comparative Examples 1 to 7, since the melt viscosity varies depending on the position inside the mold, the melt viscosity was not measured.

Tables 1 and 2 show the bending strength of each of the molded articles obtained in Examples 5 to 14 and Comparative Examples 1 and 4 to 7.

Figure 2B:
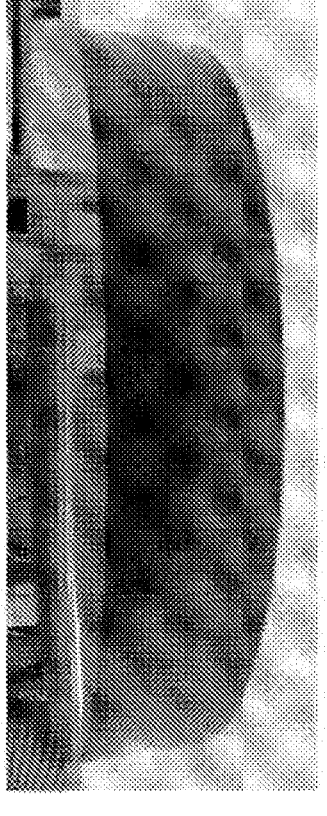
FIG. 2B is a photograph showing a surface (side surface) of the molded article obtained in Example 11.
Figure 2A:
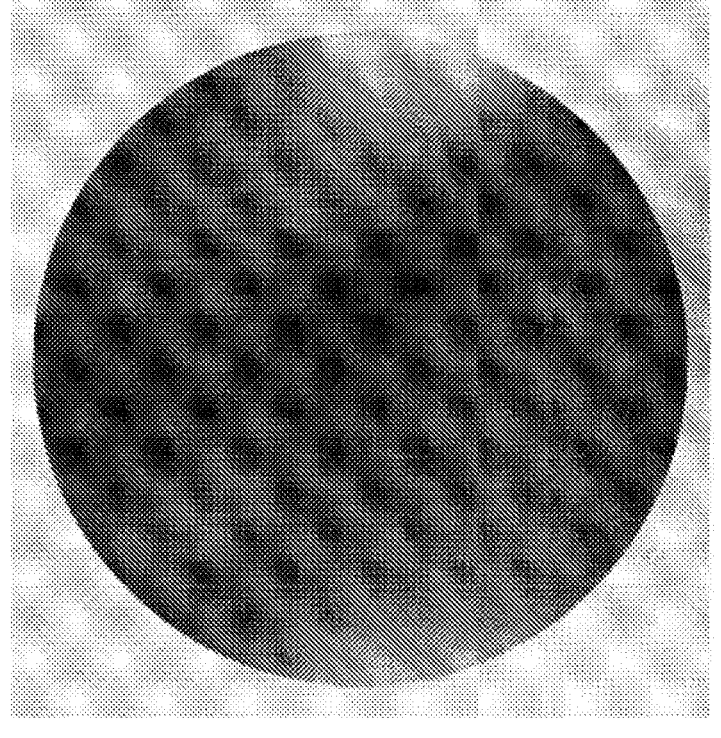
FIG. 2A is a photograph showing a surface (compression surface) of a molded article obtained in Example 11.
Figure 3A:
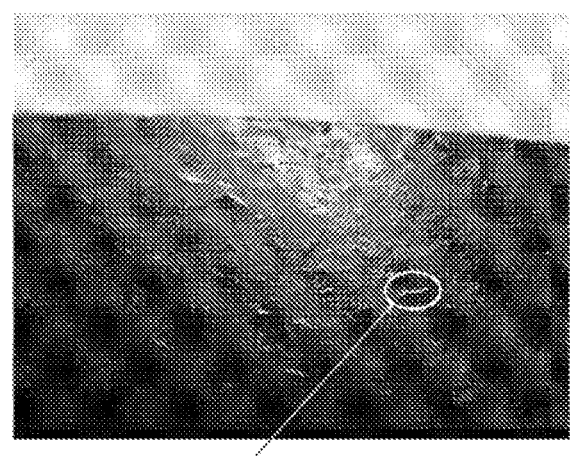
FIG. 3A is a photograph showing the surface of the molded article obtained in Example 11 after being subjected to post-heating.
Figure 3B:
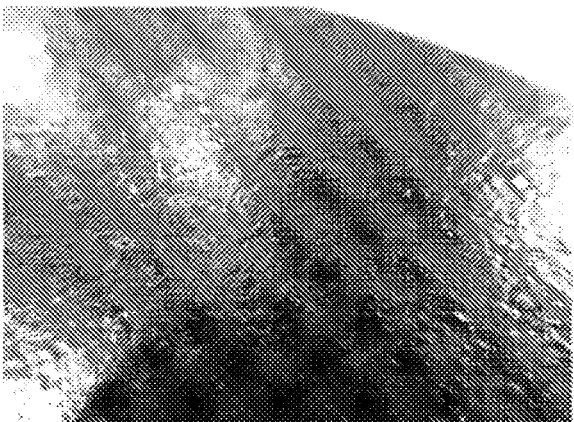
FIG. 3B is a photograph showing a surface of a molded article obtained in Example 12 after being subjected to post-heating.

FIGS. 2A and 2B each show a surface of the molded article obtained in Example 11. FIG. 2A shows a compression surface, and FIG. 2B shows a side surface. FIG. 3A is a surface enlarged photograph after the evaluation after being subjected to post-heating.

Figure 4:
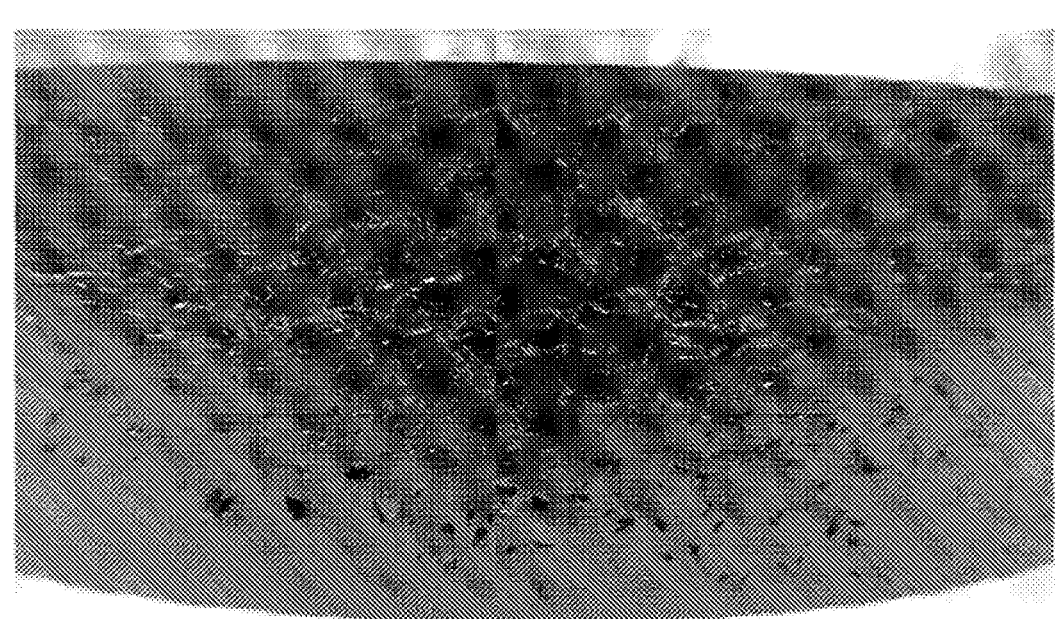
FIG. 4 is an enlarged photograph showing a surface (side surface) of a molded article obtained in Comparative Example 7.

FIG. 4 is an enlarged photograph of a side surface of a molded article obtained in Comparative Example 7. As is clear from FIG. 4, a large number of voids having a size of 2 to 3 mm were generated, and the voids were connected to each other to form cracks in some sections.

Further, FIGS. 5A and 5B are each a photograph showing a surface after the evaluation after being subjected to post-heating. FIG. 5A shows the compression surface, and FIG. 5B shows the side surface. As is clear from FIGS. 5A and 5B, there were some sections that deformed into a recessed shape.

Figure 6:
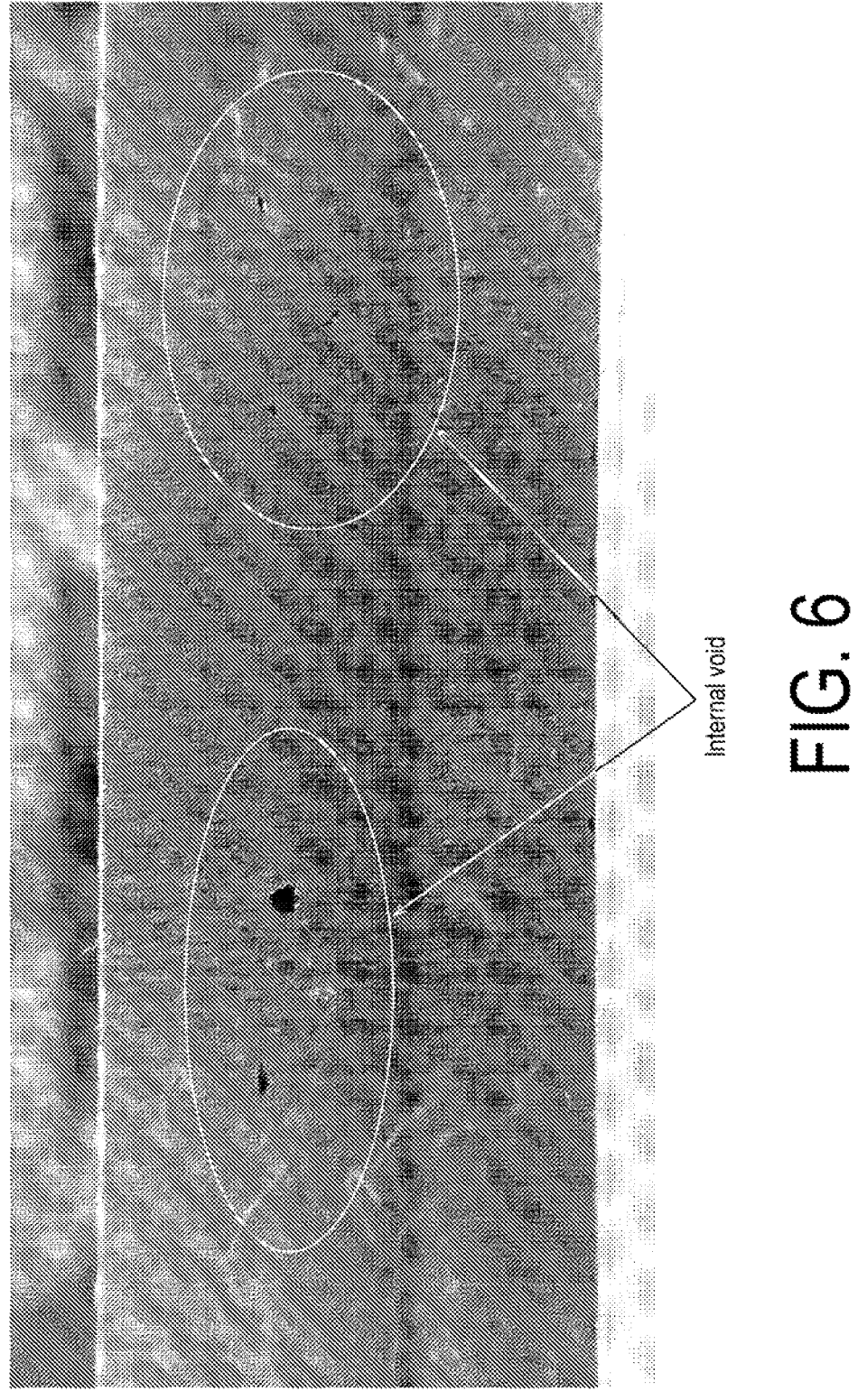
FIG. 6 is a photograph showing a cross section in a thickness direction of a molded article obtained in Comparative Example 5.
Figure 7:
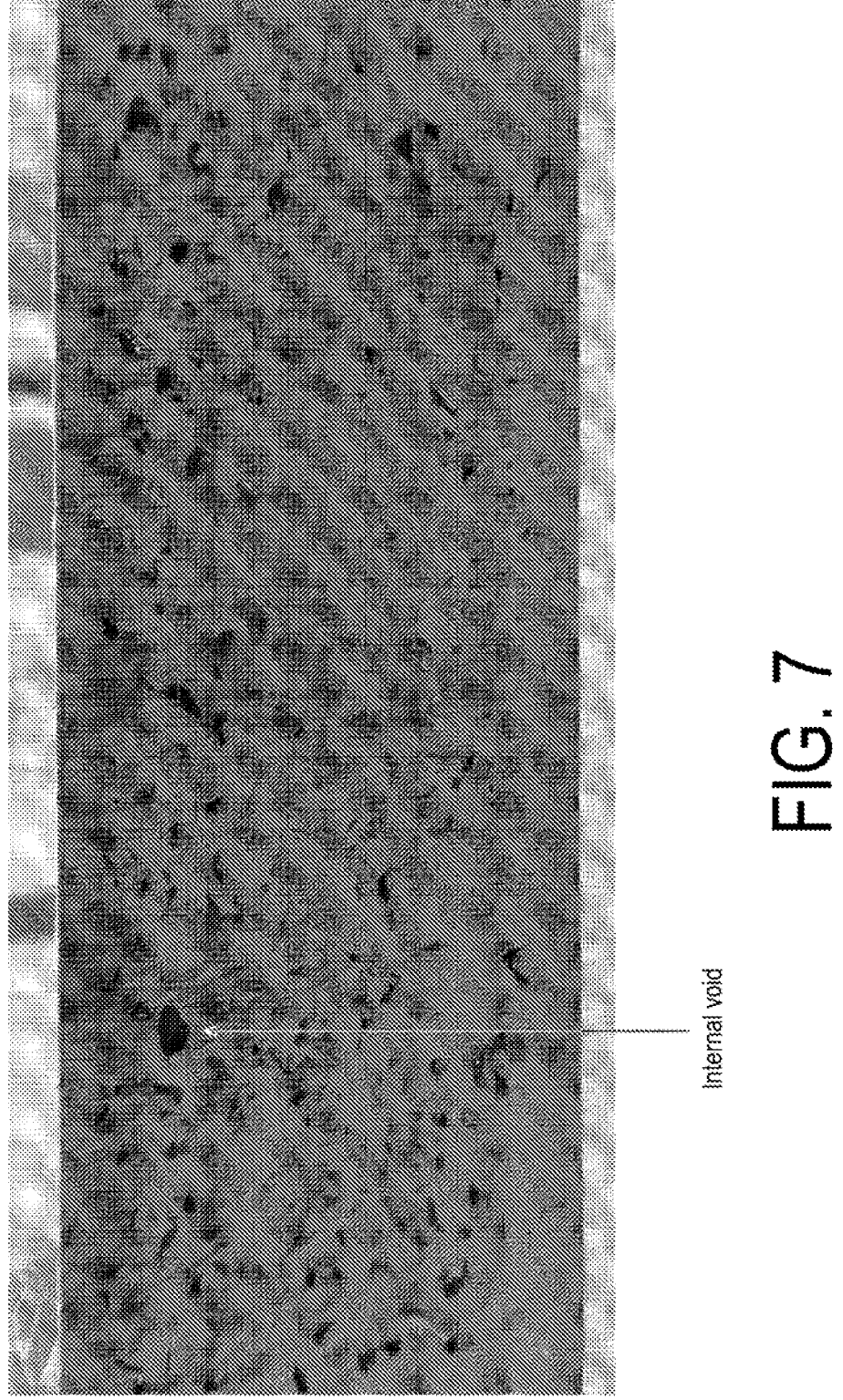
FIG. 7 is a photograph showing a cross section in a thickness direction of the molded article obtained in Comparative Example 7.

Further, FIGS. 6 and 7 show cross sections in the thickness direction of the molded articles obtained in Comparative Examples 5 and 7. As is apparent from FIG. 6, in Comparative Example 5, i.e., a 15 mm molded article, a plurality of internal voids was partially formed. As is apparent from FIG. 7, in Comparative Example 7, i.e., a molded article having a thickness of 30 mm, a large number of internal voids were present as a whole.

TABLE 1-1

| | Example 1 | Example 2 | Example 3 | Example 4 | Example 5 |
|---|---|---|---|---|---|
| Thickness of resin molded body (mm) | 5 | 5 | 7 | 7 | 10 |
| Viscosity-increasing process | Increasing viscosity in advance | | | | |
| Viscosity-increasing time [min] | 65 | 95 | 65 | 95 | 65 |
| BMC viscosity [kPa · s] | 126.6 | 642.9 | 126.6 | 642.9 | 126.6 |
| Evaluation of surface defects of resin molded body | Good | Good | Good | Good | Good |
| Post-heating evaluation after molding | Good: partially appeared protrusions having height of less than 1 mm on surface | | | | |
| Bending strength (MPa) Cut-out position — 3 mm from upper surface of molded article | — | — | — | — | 99.3 |
| ±1.5 mm from middle plane of molded article | | | | | 123.3 |
| 3 mm from lower surface of molded article | | | | | 107.5 |

TABLE 1-2

| | Example 6 | Example 7 | Example 8 | Example 9 | Example 10 |
|---|---|---|---|---|---|
| Thickness of resin molded body (mm) | 10 | 15 | 15 | 20 | 20 |
| Viscosity-increasing process | Increasing viscosity in advance | | | | |
| Viscosity-increasing time [min] | 95 | 65 | 95 | 65 | 95 |
| BMC viscosity [kPa · s] | 642.9 | 126.6 | 642.9 | 126.6 | 642.9 |
| Evaluation of surface defects of resin molded body | Good | Good | Good | Good | Good |
| Post-heating evaluation after molding | Good: partially appeared protrusions having height of less than 1 mm on surface | | | | |
| Bending strength (MPa) Cut-out position — 3 mm from upper surface of molded article | 114.4 | 126.1 | 105.6 | 114.5 | 111.3 |
| ±1.5 mm from middle plane of molded article | 119.1 | 112.4 | 117.3 | 122.3 | 109.6 |
| 3 mm from lower surface of molded article | 121 | 108.5 | 114.5 | 107.8 | 121.2 |

TABLE 1-3

| | Example 11 | Example 12 | Example 13 | Example 14 |
|---|---|---|---|---|
| Thickness of resin molded body (mm) | | 30 | | |
| Viscosity-increasing process | | Increasing viscosity in advance | | |
| Viscosity-increasing time [min] | 65 | 95 | 110 | 120 |
| BMC viscosity [kPa · s] | 126.6 | 642.9 | 896.3 | 1151.1 |
| Evaluation of surface defects of resin molded body | Good | Good | Good | Poor Surface cracks and voids |
| Post-heating evaluation after molding | | Good: partially appeared protrusions having height of less than 1 mm on surface | | |
| Bending strength (MPa) Cut-out position | 3 mm from upper surface of molded article | 92.3 | 117.4 | 76 | 64 |
| | ±1.5 mm from middle plane of molded article | 112.3 | 131.7 | 77.8 | 60.8 |
| | 3 mm from lower surface of molded article | 109.5 | 122.6 | 78.8 | 63 |

TABLE 2

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Thickness of resin molded body [mm] | 3 | 5 | 7 | 10 | 15 | 20 | 30 | 30 |
| Viscosity-increasing process | | | Increasing viscosity in mold | | | | | Increasing viscosity in advance |
| Viscosity-increasing time [min] | | 45 | | | 40 | | | 60 |
| BMC viscosity [kPa · s] | — | — | — | — | — | — | — | 60.4 |
| Evaluation of surface defects of resin molded body and internal voids | Good | Poor Surface bubbles | Poor Surface bubbles | Poor Surface bubbles | Poor Surface and internal voids | Poor Surface and internal voids | Poor Surface and internal voids | Poor Surface depression |
| Post-heating evaluation after molding | | | Poor Partial swelling and erosion | | | | Poor Overall swelling and destruction | Good Partially appeared protrusions having height of less than 1 mm on surface |
| Bending strength (MPa) Cut-out position | 3 mm from upper surface of molded article | 111.3 | — | — | 122.3 | 36.6 | 40.3 | 32.4 | — |
| | ±1.5 mm from middle plane of molded article | | | — | 112.9 | 45.9 | 31.4 | 28 | — |
| | 3 mm from lower surface of molded article | | | — | 125.7 | 47.4 | 41.9 | 34.6 | — |

INDUSTRIAL APPLICABILITY

Although the resin molded body of the disclosure is a thick molded body having a thickness of 5 mm or more, surface defects are remarkably reduced, generation of voids in the resin molded body is reduced, the heat resistance, durability, and mechanical strength are excellent. Thus, the resin molded body can be used for various applications as a member in automobile, electrical and electronic fields, and the like.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An addition reaction type polyimide resin molded body having a thickness of 5 mm or more, wherein a number of defects having a size of 0.5 mm or more present on an entire surface of the molded body is 1 per 100 cm$^2$ or less.

2. An addition reaction type polyimide resin molded body having a thickness of 15 mm or more, wherein the addition reaction type polyimide resin molded body has a bending strength of 60 MPa or more.

3. The addition reaction type polyimide resin molded body according to claim 1, wherein the defects are recesses or bubbles having a maximum diameter of 0.5 mm or more, or fissures having a length of 0.5 mm or more.

4. The addition reaction type polyimide resin molded body according to claim 1, wherein the addition reaction type polyimide resin molded body has a bending strength of 60 MPa or more.

5. The addition reaction type polyimide resin molded body according to claim 1, wherein the addition reaction type polyimide resin is a polyimide resin having a phenylethynyl group as an addition-reaction group.

6. The addition reaction type polyimide resin molded body according to claim 1, wherein the molded body has a disk or rectangular flat plate shape with a thickness of 5 to 30 mm.

7. The addition reaction type polyimide resin molded body according to claim 1, wherein the addition reaction type polyimide resin molded body does not deform or deforms into a recessed shape with a height of less than 1 mm when heated at a temperature of 357° C. for 6 hours.

8. A method for producing an addition reaction type polyimide resin molded body, the method comprising:

increasing a melt viscosity at a temperature lower by 10° C. than a viscosity increase starting temperature of an addition reaction type polyimide resin to 70 to 900 kPa·s by holding a prepolymer of the addition reaction type polyimide resin at a temperature equal to or higher than the viscosity increase starting temperature;

grinding and mixing the addition reaction type polyimide resin subjected to the increasing of the melt viscosity to powderize the addition reaction type polyimide resin; and shaping the powderized addition reaction type polyimide resin at a temperature equal to or higher than a heat-curing temperature of the addition reaction type polyimide resin.

9. The method according to claim 8, wherein in the increasing of the melt viscosity, the addition reaction type polyimide resin is held in a temperature range higher by 15 to 45° C. than the viscosity increase starting temperature for 50 to 200 minutes.

10. The method according to claim 8, wherein the shaping is performed by compression molding.

11. A molding precursor comprising an addition reaction type polyimide resin, wherein the addition reaction type polyimide resin has a melt viscosity of 70 to 900 kPa·s at a temperature lower by 10° C. than a viscosity increase starting temperature of the addition reaction type polyimide resin.

* * * * *